(12) United States Patent
Zhang et al.

(10) Patent No.: US 7,644,756 B2
(45) Date of Patent: Jan. 12, 2010

(54) OIL RECOVERY BY INJECTION OF STEAM, CARBON DIOXIDE AND NITROGEN

(75) Inventors: Fengshan Zhang, Panjin (CN); Yuanwen Gao, Panjin (CN)

(73) Assignee: CNPC Greatwall Drilling Engineering Company Limited, Beijing (CN)

( * ) Notice: Subject to any disclaimer, the term of this patent is extended or adjusted under 35 U.S.C. 154(b) by 0 days.

(21) Appl. No.: 11/940,261

(22) Filed: Nov. 14, 2007

(65) Prior Publication Data
US 2008/0236812 A1 Oct. 2, 2008

(30) Foreign Application Priority Data
Mar. 30, 2007 (CN) .......................... 200720011438

(51) Int. Cl.
*E21B 21/10* (2006.01)
*E21B 34/16* (2006.01)
(52) U.S. Cl. .................................... 166/90.1; 166/91.1
(58) Field of Classification Search ....................... None
See application file for complete search history.

(56) References Cited

U.S. PATENT DOCUMENTS 4,114,688 A * 9/1978 Terry .......................... 166/246
4,434,613 A * 3/1984 Stahl ........................... 60/784

* cited by examiner

*Primary Examiner*—Zakiya W. Bates
(74) *Attorney, Agent, or Firm*—Mintz, Levin, Cohn, Ferris, Glovsky and Popeo, P.C.

(57) ABSTRACT

Equipment for oil recovery can include three systems: a steam system, a carbon dioxide system and a nitrogen system. The three systems can include one or more of a steam pressure regulator, a steam thermometer, a steam pressure gauge, a steam flowmeter, a carbon dioxide pressure regulator, a carbon dioxide compressor, a carbon dioxide thermometer, a carbon dioxide pressure gauge, a nitrogen compressor, a nitrogen pressure regulator, a nitrogen thermometer, a nitrogen pressure gauge, assembled valves, a gas injection tube and a chemical agent valve. The three systems can be connected into a heavy oil well via the assembled valves, the gas injection tube and a down-hole tube. The equipment can integrate three pressurizing and metering systems of steam, carbon dioxide and nitrogen together. With the equipment, one, two or three of the gases may be injected into oil wells to achieve favorable results of output increase.

1 Claim, 1 Drawing Sheet

OIL RECOVERY BY INJECTION OF STEAM, CARBON DIOXIDE AND NITROGEN

CROSS REFERENCE

Figure 1:
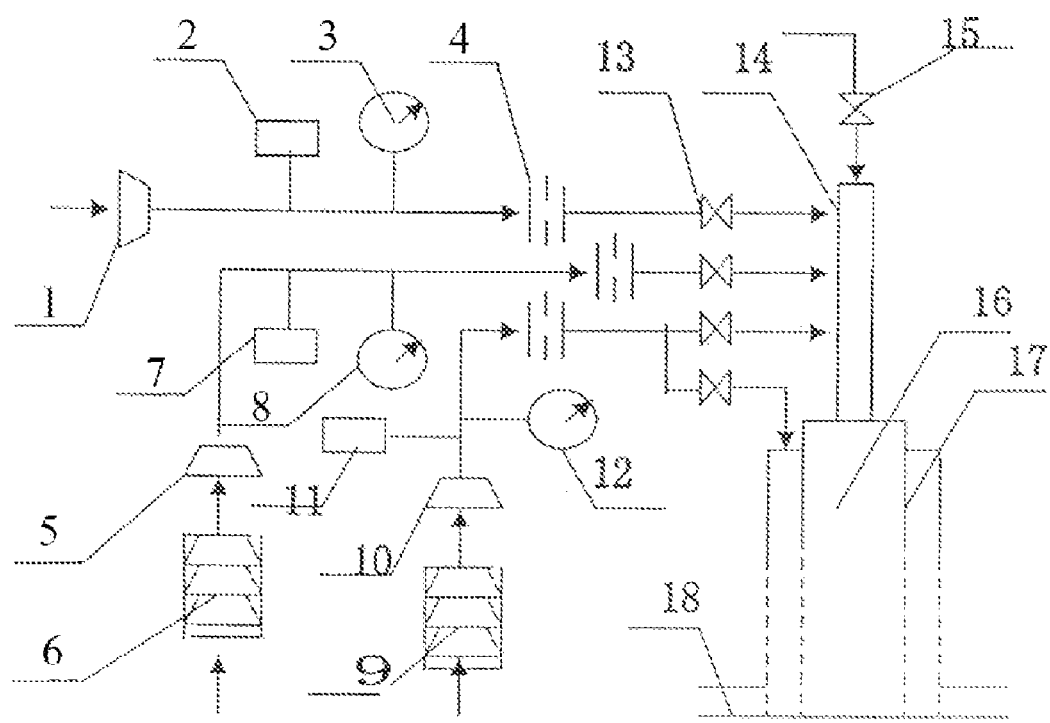

The present patent application claims priority under 35 U.S.C. §119 to Chinese Patent Application Serial No. 200720011438.5 filed on Mar. 30, 2007, and entitled, "Equipment for Oil Recovery by United Injection of Steam, Carbon Dioxide and Nitrogen" the entire disclosure of which is incorporated by reference herein.

FIELD

This subject matter described herein relates to systems and methods for injection of steam, carbon dioxide and nitrogen for miscible flooding in thermal recovery of heavy oil.

BACKGROUND

In oil fields, reservoir bed belonging to the continental facies bears considerable heterogeneity during the process of sedimentation. Part of the crude oil containing water has fast rising velocity due to its high viscosity. In addition, the exploitation of many oil fields has entered into the middle or later period: though a series of measures such as water or steam injection have been taken, the recovery efficiency of crude oil is still low, the exploitation cost is high, and a lot of original oil in-place is difficult to or even cannot be exploited economically. Worse still, the recovery efficiency is even lower while the cost is even higher with regard to low permeable oil, heavy oil as well as crude oil of condensate gas reservoirs.

Natural gas injection into the oil field has been used for oil recovery. Fairly favorable results can be obtained for the following reason: natural gas possesses some properties of crude oil in oil reservoirs and would not cause any harm to the oil bed; in sequence, miscibility can be obtained under relatively low pressures or in the process of flooding. However, the technology is, to a certain extent, restricted by economic factors for the rising price of gas hydrate (including natural gas), which, as a result, motivates the studies on the injection of other gases, especially carbon dioxide and nitrogen.

Oil recovery efficiency to flood carbon dioxide and/or nitrogen into the oil fields can be increased using steam injection. Having high solubility in both water and oil, carbon dioxide, when solved into crude oil in huge amount, can expand the volume as well as decrease the viscosity of the crude oil. During the process of miscible flooding, carbon dioxide extracts and gasifies the light components contained in the crude oil, and in this way the interfacial tension is reduced and flooding is carried out. Meanwhile, carbon dioxide bears the excellent functions of improving mobility ratio, extracting and gasifying light hydrocarbons in crude oil as well as increasing, by molecular diffusion, the permeability of oil reservoirs, etc.

Flue gas of combustors such as boilers etc. consists of carbon dioxide and nitrogen, two key and economical gases for oil recovery by gas injection. With coal, gas or oil as the fuel, combustors including boilers used in oil fields usually produce flue gas containing 9%~15% carbon dioxide, 0%~85% nitrogen and slight quantity of oxygen, sulfur dioxide and water.

Reclamation of carbon dioxide from flue gas of coal, gas or oil boilers may protect the environment and realize environment-friendly production. As the dominating component of greenhouse gases, carbon dioxide exerts non-negligible negative influence on the global ecological system, on the economic development as well as on the health and life quality of human beings. A critical point for minimizing the greenhouse effect is to restrict the content of carbon dioxide in the atmosphere. Reclamation of carbon dioxide has tremendous significance, considered from the viewpoint of tackling the greenhouse effect problem. Therefore, it is of great significance to reclaim carbon dioxide from flue gas of combustor so as to apply it in gas injection oil producing technology, which may not only increase the crude oil output but also reduce pollution to the environment.

Nitrogen has low solubility in water and the similar viscosity as methane for its larger compressibility and formation volume factor than other gases. As an inert gas, it has no toxicity or corrosivity or flammability; mixture of nitrogen with most of fluids always presents in the phase of cystose, which may have certain lifting influence on the fluids. The above properties enables nitrogen to improve the recovery efficiency of oil by various flooding modes such as immiscible flooding, miscible flooding, gravity flooding, combination flooding and water-gas alternating flooding, etc.

Thermal recovery has dominated the exploitation mode of some heavy oil blocks in some oil fields. Take wet steam generator (23 ton thermal recovery boiler) for example: with natural gas as the fuel, each boiler discharges approximately 480 million $Nm^3$ of flue gas per year, which, if used as the proximal gas resource of carbon dioxide and nitrogen, may drastically lower the oil recovery cost and provide optimal resources for oil recovery by flue gas injection.

Gas injection into the oil well is an important technology for improving the oil recovery efficiency by reducing interfacial tension, lowering the viscosity of crude oil and restoring or maintaining the reservoir pressure when gases and crude oil form into immiscible or miscible phase for different gases and under different reservoir conditions.

The primary components of flue gas of steam-injection boilers, in the process of thermal recovery of heavy oil by steam injection, are carbon dioxide and nitrogen. As is presented by studies, combination of steam boilers and mate flue gas reclaim equipment may realize the selective injection of steam, carbon dioxide, nitrogen or their mixture, which not only acquires satisfactory results of outcome increase but also is conducive to the environment protection.

SUMMARY

Systems and techniques are provided to inject steam, carbon dioxide and nitrogen together into a heavy oil well in order to improve a recovery ratio.

In one aspect, system and techniques for oil recovery by injection of steam, carbon dioxide and nitrogen are provided that include a steam pressure regulator, a steam thermometer, a steam pressure gauge, a steam flowmeter, a carbon dioxide pressure regulator, a carbon dioxide compressor, a carbon dioxide thermometer, a carbon dioxide pressure gauge, a nitrogen compressor, a nitrogen pressure regulator, a nitrogen thermometer, a nitrogen pressure gauge, assembled valves, a gas injection tube and a chemical agent valve.

The steam pressure regulator, the steam thermometer, the steam pressure gauge and the steam flowmeter can be connected in sequence in a steam system. The carbon dioxide compressor, the carbon dioxide pressure regulator, the carbon dioxide thermometer and the carbon dioxide pressure gauge can be connected in sequence in a carbon dioxide system. The nitrogen compressor, the nitrogen pressure regulator, the nitrogen thermometer and the nitrogen pressure gauge can be connected in sequence in a nitrogen system. The aforementioned three systems can be connected into a heavy oil well via the assembled valves, the gas injection tubes and a down-hole tube.

In other words, in some variations, oil recovery can be effected using three systems including a steam system, a carbon dioxide system and a nitrogen system. The sub-three systems can contain a steam pressure regulator, a steam thermometer, a steam pressure gauge, a steam flowmeter, a carbon dioxide pressure regulator, a carbon dioxide compressor, a carbon dioxide thermometer, a carbon dioxide pressure gauge, a nitrogen compressor, a nitrogen pressure regulator, a nitrogen thermometer, a nitrogen pressure gauge, assembled valves, a gas injection tube and a chemical agent valve. After pressurized and metered respectively, steam, carbon dioxide and nitrogen are injected into the heavy oil well together with chemical agents, and thereby the crude oil output is increased.

Process flows of each part of the equipment can be as follows: in the steam system, the steam pressure regulator, the steam thermometer, the steam pressure gauge and the steam flowmeter can be connected in sequence. In the carbon dioxide system, the carbon dioxide compressor, the carbon dioxide pressure regulator, the carbon dioxide thermometer and the carbon dioxide pressure gauge can be connected in sequence. In the nitrogen system, the nitrogen compressor, the nitrogen pressure regulator, the nitrogen thermometer and the nitrogen pressure gauge can be connected in sequence; and for the increase of crude oil production, the above three systems can be connected into a heavy oil well respectively via the assembled valves, the gas injection tube and the down-hole tube.

The subject matter described herein integrates three pressurizing and metering systems of steam, carbon dioxide and nitrogen together so as to provide comprehensive system and techniques for oil recovery by injection of steam, carbon dioxide and nitrogen. With the current systems and techniques, one, two or three of the gases may be injected into oil wells to achieve favorable results of output increase.

DESCRIPTION OF THE ACCOMPANYING DRAWINGS

FIG. 1 is an overall structural diagram of the subject matter described herein. Numerals "16", "17" and "18" refer respectively to the injection tube, the well casing and the oil layer.

DETAILED DESCRIPTION

As is illustrated in FIG. 1, equipment for heavy oil recovery by injection of steam, carbon dioxide and nitrogen can comprise one or more of a steam pressure regulator 1, a steam thermometer 2, a steam pressure gauge 3, a steam flowmeter 4, a carbon dioxide pressure regulator 5, a carbon dioxide compressor 6, a carbon dioxide thermometer 7, a carbon dioxide pressure gauge 8, a nitrogen compressor 9, a nitrogen pressure regulator 10, a nitrogen thermometer 11, a nitrogen pressure gauge 12, assembled valves 13, a gas injection tube 14 and a chemical agent valve 15.

The structure, assembly and installment of the equipment for heavy oil recovery by injection of steam, carbon dioxide and nitrogen is provided below.

The equipment can include three systems, namely, a steam system, a carbon dioxide system and a nitrogen system.

The steam system can include the steam pressure regulator 1, the steam thermometer 2, the steam pressure gauge 3 and the steam flowmeter 4 connected in sequence within a steam pipeline system.

The carbon dioxide system can include the carbon dioxide compressor 6, the carbon dioxide pressure regulator 5, the carbon dioxide thermometer 7 and the carbon dioxide pressure gauge 8 connected in sequence within a carbon dioxide pipeline system.

The nitrogen system can include the nitrogen compressor 9, the nitrogen pressure regulator 10, the nitrogen thermometer 11 and the nitrogen pressure gauge 12 connected in sequence within a nitrogen pipeline system.

The above three systems can be connected into the heavy oil well respectively via the assembled valves 13, the gas injection tube 14 and the down-hole tube 16.

In the equipment, the steam can be supplied by a steam boiler; the carbon dioxide can be supplied by a carbon dioxide generating unit or carbon dioxide tank trucks; the nitrogen can be supplied by a nitrogen generating unit, a nitrogen generating truck or a nitrogen generating tank truck; the carbon dioxide and nitrogen may also be reclaimed from the flue gas of the steam boiler.

Injection of the three gases may be controlled using a variety of mechanisms. For example, by opening-closing each valve of the assembled valves 13, one gas may be injected into a heavy oil well at constant or variable flow rates during one period, while another gas may be injected into the heavy oil well at constant or variable flow rates during the next period. Additionally, by opening-closing and opening-degree control of each valve of the assembled valves 13, two selected gases may be injected into the heavy oil well at pre-set constant or variable flow ratios and total flow. Furthermore, it is contemplated that by opening-degree control of each valve of the assembled valves 13, three gases may be injected into the heavy oil well simultaneously at constant or variable flow ratios.

As is stated above, heavy oil recovery by injection of steam, carbon dioxide and nitrogen, the three gases (steam, carbon dioxide and nitrogen) may be injected unitedly with different combinations and matching ratios. This arrangement has enriched the technologies of heavy oil recovery, enabling oil recovery art more diverse for more practical conditions and thereby notably increasing the recovery efficiency of heavy oil wells.

Although a few variations have been described in detail above, other modifications are possible. For example, the process flow depicted in the accompanying figure and described herein do not require the particular order shown, or sequential order, to achieve desirable results. Moreover, different sub-components may be utilized in order to achieve desirable results. Other embodiments may be within the scope of the following claims.

What we claimed is:

1. An apparatus for oil recovery by injection of steam, carbon dioxide and nitrogen, comprising:
    a steam pressure regulator;
    a steam thermometer;
    a steam pressure gauge;
    a steam flowmeter;
    a carbon dioxide pressure regulator;
    a carbon dioxide compressor;
    a carbon dioxide thermometer;
    a carbon dioxide pressure gauge;
    a nitrogen compressor;
    a nitrogen pressure regulator;
    a. nitrogen thermometer;
    a nitrogen pressure gauge;
    assembled valves;
    a gas injection tube; and
    a chemical agent valve;

the steam pressure regulator, the steam thermometer, the steam pressure gauge and the steam flowmeter being connected in sequence in a steam system;

the carbon dioxide compressor, the carbon dioxide pressure regulator, the carbon dioxide thermometer and the carbon dioxide pressure gauge being connected in sequence in a carbon dioxide system;

the nitrogen compressor, the nitrogen pressure regulator, the nitrogen thermometer and the nitrogen pressure gauge being connected in sequence in a nitrogen system; and the steam system, the carbon dioxide system, and the nitrogen system being connected into a heavy oil well via assembled valves, the gas injection tube and a downhole tube.

* * * * *